US012331375B2

(12) United States Patent
Song et al.

(10) Patent No.: US 12,331,375 B2
(45) Date of Patent: Jun. 17, 2025

(54) GRAIN-ORIENTED ELECTRICAL STEEL SHEET AND METHOD FOR PRODUCING SAME

(71) Applicant: POSCO, Pohang-si (KR)

(72) Inventors: Dae-Hyun Song, Pohang-si (KR); June Soo Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 769 days.

(21) Appl. No.: 17/413,893

(22) PCT Filed: Dec. 10, 2019

(86) PCT No.: PCT/KR2019/017394
§ 371 (c)(1),
(2) Date: Jun. 14, 2021

(87) PCT Pub. No.: WO2020/122558
PCT Pub. Date: Jun. 18, 2020

(65) Prior Publication Data

US 2022/0064749 A1 Mar. 3, 2022

(30) Foreign Application Priority Data

Dec. 13, 2018 (KR) ........................ 10-2018-0160910

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/002* (2013.01); *C21D 6/008* (2013.01); *C21D 8/1222* (2013.01);
(Continued)

(58) Field of Classification Search
None
See application file for complete search history.

(56) References Cited

U.S. PATENT DOCUMENTS 3,991,948 A 11/1976 Schober et al.
2013/0213525 A1* 8/2013 Shingaki .................. C23C 2/24 148/108

(Continued)

FOREIGN PATENT DOCUMENTS

CN 106414780 A 2/2017
EP 3144400 A1 3/2017

(Continued)

OTHER PUBLICATIONS

Machine translation of KR10-2013-0026243A. (Year: 2013).*

(Continued)

*Primary Examiner* — Xiaowei Su
(74) *Attorney, Agent, or Firm* — Morgan Lewis & Bockius LLP

(57) ABSTRACT

A grain-oriented electrical steel sheet according to an embodiment of the present invention includes: an electrical steel sheet substrate including, by wt %, 2.0 to 6.0% of Si, equal to or less than 0.005% of C (excluding 0%), 0.01 to 0.05% of Sb, 0.03 to 0.08% of Sn, 0.01 to 0.2% of Cr, and 0.0003 to 0.097% of Co, and including a remainder of Fe and inevitable impurities; and a metal oxide layer disposed on a surface of the electrical steel sheet substrate, wherein the metal oxide layer includes 0.0005 to 0.25 wt % of Co.

4 Claims, 2 Drawing Sheets

(51) Int. Cl.

| | |
|---|---|
| ***C21D 8/12*** | (2006.01) |
| ***C22C 38/00*** | (2006.01) |
| ***C22C 38/06*** | (2006.01) |
| ***C22C 38/30*** | (2006.01) |
| ***C22C 38/34*** | (2006.01) |
| ***C22C 38/60*** | (2006.01) |
| ***H01F 1/147*** | (2006.01) |

(52) U.S. Cl.

CPC ......... *C21D 8/1233* (2013.01); *C21D 8/1272* (2013.01); *C22C 38/001* (2013.01); *C22C 38/002* (2013.01); *C22C 38/008* (2013.01); *C22C 38/06* (2013.01); *C22C 38/30* (2013.01); *C22C 38/34* (2013.01); *C22C 38/60* (2013.01); *H01F 1/147* (2013.01); *C21D 2201/05* (2013.01); *C22C 2202/02* (2013.01)

(56) References Cited

U.S. PATENT DOCUMENTS

| | | | | |
|---|---|---|---|---|
| 2017/0088915 | A1 | 3/2017 | Suehiro et al. | |
| 2018/0171425 | A1 | 6/2018 | Shingaki et al. | |
| 2020/0058434 | A1* | 2/2020 | Zhao .................... | C21D 8/1222 |
| 2021/0043345 | A1* | 2/2021 | Kataoka ................ | C22C 38/002 |

FOREIGN PATENT DOCUMENTS

| | | | |
|---|---|---|---|
| JP | S30-3651 | A | 5/1955 |
| JP | S40-15644 | A | 7/1965 |
| JP | S51-13469 | A | 2/1976 |
| JP | S62-227078 | A | 10/1987 |
| JP | H05-125446 | A | 5/1993 |
| JP | H05-295447 | A | 11/1993 |
| JP | H05-345920 | A | 12/1993 |
| JP | H06-116643 | A | 4/1994 |
| JP | H06-086631 | B2 | 11/1994 |
| JP | H10-140297 | A | 5/1998 |
| JP | H10-152724 | A | 6/1998 |
| JP | 2000-144248 | A | 5/2000 |
| JP | 2000-178647 | A | 6/2000 |
| JP | 2000-192204 | A | 7/2000 |
| JP | 2006-274405 | A | 10/2006 |
| JP | 2007-238984 | A | 9/2007 |
| JP | 4321120 | B2 | 8/2009 |
| JP | 2009-197299 | A | 9/2009 |
| JP | 4823719 | B2 | 11/2011 |
| JP | 6103281 | B2 | 3/2017 |
| JP | WO2015174362 | A1 | 4/2017 |
| JP | 2017-133080 | A | 8/2017 |
| KR | 10-1173334 | B1 | 8/2012 |
| KR | 1020130026243 | * | 3/2013 |
| KR | 10-2013-0071969 | A | 7/2013 |
| KR | 10-1353550 | B1 | 2/2014 |
| KR | 10-2016-0078133 | A | 7/2016 |
| KR | 10-1736627 | B1 | 5/2017 |
| KR | 10-1751526 | B1 | 6/2017 |

OTHER PUBLICATIONS

International Search Report (with partial translation) and Written Opinion dated Apr. 2, 2020, issued in corresponding International Patent Application No. PCT/KR2019/017394.

Extended European Search Report dated Dec. 14, 2021 issued in European Patent Application No. 19894709.5.

M. Kodym, et al. "Spurenelemente in Staehlen," Verlag Stahleisen, Duesseldorf, Germany, Jan. 1, 1985, pp. 19-22, XP002433212 (partial English translation).

* cited by examiner

GRAIN-ORIENTED ELECTRICAL STEEL SHEET AND METHOD FOR PRODUCING SAME

CROSS-REFERENCE OF RELATED APPLICATIONS

This application is the U.S. National Phase under 35 U.S.C. § 371 of International Application No. PCT/KR2019/017394 filed on Dec. 10, 2019, which claims the benefit of Korean Application No. 10-2018-0160910 filed on Dec. 13, 2018, the entire contents of each are hereby incorporated by reference.

TECHNICAL FIELD

The present disclosure relates to a grain-oriented electrical steel sheet and a manufacturing method thereof. Particularly, it relates to a method for manufacturing a grain-oriented electrical steel sheet for improving magnetism by suppressing thickening of Co in a metal oxide layer by controlling atmosphere gas in a primary recrystallization annealing process.

BACKGROUND ART

A grain-oriented electrical steel sheet indicates a Goss texture in which a texture of a steel sheet is {110}<001> in a rolling direction, so it is a soft ferrite material with an excellent magnetic characteristic in one direction or a rolling direction, and in order to express the texture, complicated processes such as component control in a steelmaking, reheating of a slab and controlling of hot rolling processing factors in a hot rolling, a annealing heat treatment of a hot rolled sheet, a cold rolling, a primary recrystallization annealing, and a secondary recrystallization annealing, and these processes must be managed very precisely and strictly.

To obtain Goss texture in the secondary recrystallization annealing (or a final annealing), grow of entire primary recrystallized grains must be suppressed before a secondary recrystallization is generated, and to obtain a sufficient suppressing force, an amount of an inhibitor must be sufficient, and a distribution must also be uniform.

In another way, to allow the secondary recrystallization to be fluently generated during a high-temperature secondary recrystallization annealing process, the inhibitor must have excellent thermal stability and must not be easily decomposed. The secondary recrystallization represents a phenomenon generated when the inhibitor for suppressing growth of primary recrystallized grains is decomposed in an appropriate temperature section or loses a suppressing force, and in this case, specific grains such as the Goss grain sharply grow within a relatively short time.

Conventionally, quality of the grain-oriented electrical steel sheet may be estimated with a magnetic flux density and a core loss that are representative magnetic characteristics, and the higher the precision of the Goss texture is, the better the magnetic characteristics are. Further, the grain-oriented electrical steel sheet with excellent quality may be used to manufacture a high-efficiency power device according to its magnetic characteristic, thereby down-sizing the power device and acquiring high efficiency.

Regarding researches and developments for reducing the core loss of the grain-oriented electrical steel sheet, the research and development for increasing the magnetic flux density was first performed. The initial grain-oriented electrical steel sheet was manufactured by using MnS as a grain growth inhibiting agent and performing a cold rolling twice. The secondary recrystallization was stably formed but the magnetic flux density was not as high as expected and the core loss was somewhat high.

Another method for improving the grain growth suppressing force is to manufacture a grain-oriented electrical steel sheet by using Mn, Se, and Sb as a grain growth inhibiting agent. The method includes processes of a high-temperature slab heating, a hot rolling, a hot rolled sheet annealing, a primary cold rolling, an intermediate annealing, a secondary cold rolling, a decarburization annealing, and a final annealing, and this method has a high grain growth suppressing force and has a merit of obtaining a high magnetic flux density but the material becomes substantially hardened, it is impossible to perform a cold rolling once, so the cold rolling undergoing an intermediate annealing is performed twice, and a manufacturing cost is increased. In addition, an expensive Se is used, thereby increasing the manufacturing cost, which is a drawback.

Another proposal for improving the grain growth suppressing force is a grain-oriented electrical steel sheet manufacturing method for adding Sn and Cr in a complex way, heating a slab according to a heat treatment, performing a hot rolling, performing an intermediate annealing, performing a cold rolling once or twice, performing a decarburization annealing, and performing a nitrification process. However, in this case, the hot rolled sheet annealing process becomes complicated by strictly controlling a hot rolled sheet annealing temperature according to a very strict manufacturing standard for manufacturing a thin grain-oriented electrical steel sheet with a low core loss and a high magnetic flux density, that is, acid soluble Al and silicon steel nitrogen content, an oxidation layer formed for a decarburization nitrification annealing process becomes very thick because of Cr having strong oxygen affinity, so it is not easy to perform a decarburization and a nitrification, which is a drawback.

DISCLOSURE

The present disclosure has been made in an effort to provide a method for manufacturing a grain-oriented electrical steel sheet.

In detail, the present disclosure has been made in an effort to provide a method for manufacturing a grain-oriented electrical steel sheet for improving magnetism by suppressing thickening of Co in a metal oxide layer by controlling atmosphere gas in a primary recrystallization annealing process.

An embodiment of the present invention provides a grain-oriented electrical steel sheet including: an electrical steel sheet substrate including, by wt %, 2.0 to 6.0% of Si, equal to or less than 0.005% of C (excluding 0%), 0.01 to 0.05% of Sb, 0.03 to 0.08% of Sn, 0.01 to 0.2% of Cr, and 0.0003 to 0.097% of Co, and including a remainder of Fe and inevitable impurities; and a metal oxide layer disposed on a surface of the electrical steel sheet substrate, wherein the metal oxide layer includes 0.0005 to 0.25 wt % of Co.

The electrical steel sheet substrate may further include at least one of 0.005 to 0.04 wt % of Al, 0.01 to 0.2 wt % of Mn, equal to or less than 0.01 wt % of N, equal to or less than 0.01 wt % of S, and 0.0005 to 0.045 wt % of P.

The metal oxide layer may further include 10 to 30 wt % of Si, 30 to 55 wt % of O, 25 to 50 wt % of Mg, a remainder of Fe, and inevitable impurities.

A thickness of the metal oxide layer may be 0.5 to 10 μm.

The electrical steel sheet substrate may include grains, and an average angle of β of the grains may be equal to or less than 3°.

(here, the angle of β signifies an angle between a direction of texture and a rolling direction axis with respect to a vertical rolling side.)

Another embodiment of the present invention provides a method for manufacturing a grain-oriented electrical steel sheet including: heating a slab; manufacturing a hot rolled sheet by hot rolling the slab; manufacturing a cold-rolled sheet by cold rolling the hot rolled sheet; performing a primary recrystallization annealing on the cold-rolled sheet; and performing a secondary recrystallization annealing on the cold-rolled sheet having undergone a primary recrystallization annealing, wherein the primary recrystallization annealing includes a first temperature rising stage, a second temperature rising stage, and a soaking stage, an oxidization ability of the first temperature rising stage is 0.7 to 2.0, an oxidization ability of the second temperature rising stage is 0.05 to 0.6, and an oxidization ability of the soaking stage 0.3 to 0.6.

The slab may include, by wt %, 2.0 to 6.0% of Si, 0.02 to 0.08% of C, 0.01 to 0.05% of Sb, 0.03 to 0.08% of Sn, 0.01 to 0.2% of Cr, and 0.0005 to 0.1% of Co, and including a remainder of Fe, and inevitable impurities.

The oxidization ability of the first temperature rising stage and the oxidization ability of the second temperature rising stage may satisfy Equation 1:

$$0.3 \leq [P1]-[P2] \leq 1.6 \quad \text{[Equation 1]}$$

(here, [P1] and [P2] respectively signify the oxidization ability of the first temperature rising stage and the oxidization ability of the second temperature rising stage.)

The oxidization ability of the second temperature rising stage and the oxidization ability of the soaking stage may satisfy Equation 2:

$$-0.1 \leq [P3]-[P2] \leq 0.5 \quad \text{[Equation 2]}$$

(here, [P2] and [P3] respectively signify the oxidization ability of the second temperature rising stage and the oxidization ability of the soaking stage.)

The oxidization ability of the first temperature rising stage and the oxidization ability of the soaking stage satisfy Equation 3.

$$0.3 \leq [P1]-[P3] \leq 1.5 \quad \text{[Equation 3]}$$

(here, [P1] and [P3] respectively signify the oxidization ability of the first temperature rising stage and the oxidization ability of the soaking stage.)

The first temperature rising stage may be to increase the temperature of the cold-rolled sheet up to an ending temperature of 710 to 770° C., the second temperature rising stage may be to increase the temperature to the ending temperature of 830 to 890° C. from the ending temperature of the first temperature rising stage, and the soaking stage may be to maintain the temperature within a range of the ending temperature of the second temperature rising stage to 900° C.

Atmosphere gas may include equal to or less than 50 wt % of nitrification gas in at least one of the first temperature rising stage, the second temperature rising stage, and the soaking stage.

The performing of a secondary recrystallization annealing may be performed at the soaking temperature of 900 to 1210° C.

According to the method for manufacturing a grain-oriented electrical steel sheet according to the embodiment of the present invention, the orientation of the secondary recrystallization may be accurately controlled and the magnetism may be improved by controlling the atmosphere gas in the primary recrystallization annealing process.

MODE FOR INVENTION

Figure 1:
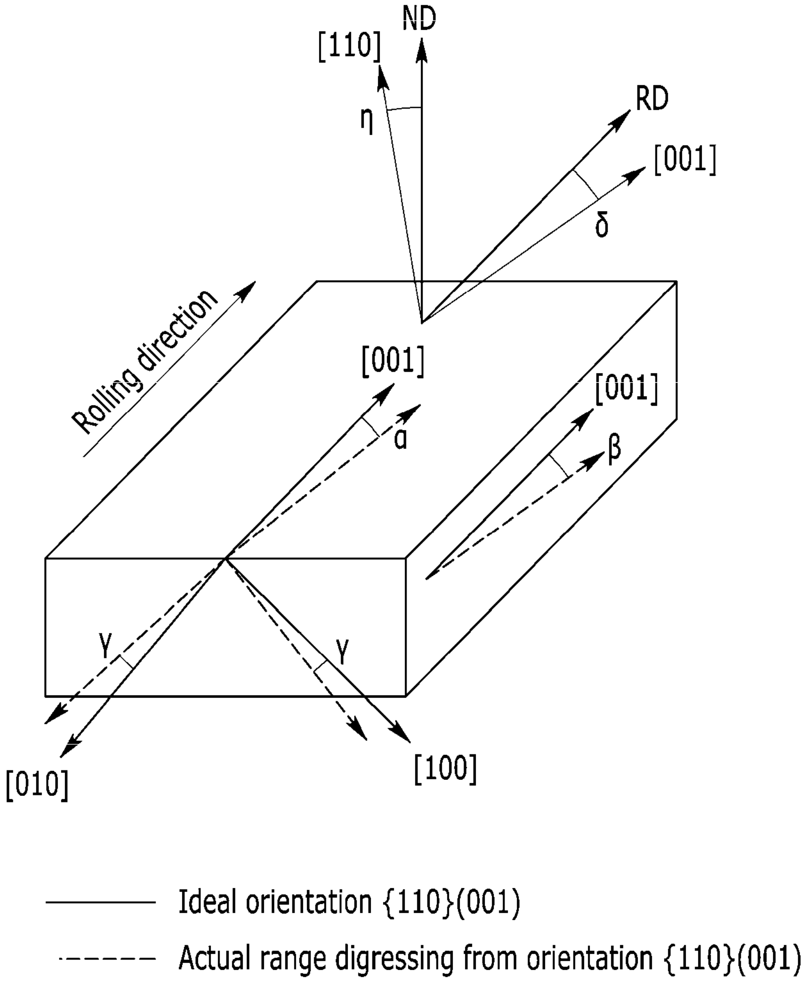
FIG. 1 shows a perspective view of a grain-oriented electrical steel sheet for a concept of angles of alpha (α), beta (β), and delta (δ).

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The technical terms used herein are to simply mention a particular exemplary embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, or combinations thereof disclosed in the specification, and are not intended to preclude the possibility that one or more other specific features, regions, numbers, operations, elements, components, or combinations thereof may exist or may be added.

When a part is referred to as being "on" another part, it can be directly on the other part or intervening parts may also be present. In contrast, when an element is referred to as being "directly on" another element, there are no intervening elements therebetween.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have idealized or excessively formal meanings unless clearly defined in the present application.

Unless otherwise specified, % represents wt %, and 1 ppm is 0.0001 wt %.

In an exemplary embodiment of the present invention, further including an additional element signifies that the added element is substituted for iron (Fe) that is a remainder.

An exemplary embodiment of the present invention will be described more fully hereinafter so that a person skilled in the art may easily realize the same. As those skilled in the art would realize, the described embodiments may be modified in various different ways, all without departing from the spirit or scope of the present invention.

A method for manufacturing a grain-oriented electrical steel sheet according to an embodiment of the present invention includes: heating a slab; manufacturing a hot rolled sheet by hot rolling the slab; manufacturing a cold-rolled sheet by cold rolling the hot rolled sheet; performing a primary recrystallization annealing to the cold-rolled sheet; and performing a secondary recrystallization annealing to the cold-rolled sheet having undergone the primary recrystallization annealing.

Respective processes will now be described in detail.

First, the slab is heated.

The slab may include, by wt %, 2.0 to 6.0% of Si, 0.02 to 0.08% of C, 0.01 to 0.05% of Sb, 0.03 to 0.08% of Sn, 0.01 to 0.2% of Cr, and 0.0005 to 0.1% of Co, and may include a remainder of Fe and inevitable impurities.

The slab may further include at least one of 0.005 to 0.04 wt % of Al, 0.01 to 0.2 wt % of Mn, equal to or less than 0.01 wt % of N, equal to or less than 0.01 wt % of S, and 0.0005 to 0.045 wt % of P.

Reasons for limiting components of the slab will now be described.

2.0 to 6.0 wt % of Si

The silicon (Si) is a basic composition of the electrical steel sheet and functions to reduce the core loss by increasing resistivity of a material.

When a very small amount of Si is added, an eddy current loss is increased because of a reduction of resistivity to thus deteriorate the characteristic of the core loss, and a phase transformation between a ferrite and an austenite is activated at the time of a primary recrystallization annealing, so primary recrystallization texture may be substantially damaged. Also, at the time of a secondary recrystallization annealing, a phase transformation between a ferrite and an austenite is generated to fail to stabilize the secondary recrystallization and substantially damage the texture of {110}<001>.

On the contrary, when a very big amount of Si is added, at the time of a primary recrystallization annealing, oxidation layers of $SiO_2$ and $Fe_2SiO_4$ may be excessively and densely formed to retard a decarburization behavior. Accordingly, the phase transformation between a ferrite and an austenite is continuously generated during the primary recrystallization annealing, so the primary recrystallization texture may be substantially damaged. A nitrification behavior is retarded by a decarburization behavior retarding effect caused by the above-described formation of a dense oxidation layer, and nitrides such as (Al,Si,Mn) N and AlN are not sufficiently formed, thereby failing to acquiring a sufficient grain suppressing force needed in the secondary recrystallization at the time of a secondary recrystallization annealing.

Further, brittleness is increased and toughness is reduced, which are mechanical characteristics of the electrical steel sheet, so a generation rate of strip breakage is intensified and a welding property between plates is lowered during the rolling process, thereby failing to obtain easy workability. Resultantly, when the content of Si is not controlled within the predetermined range, formation of secondary recrystallization becomes unstable so that the magnetic characteristic may be severely damaged and the workability may be worsened. In detail, 2.5 to 5.0 wt % of Si may be included.

0.02 to 0.08 wt % of C

The carbon (C) is an element for supporting to generate a phase transformation between ferrite and austenite and thereby make fine grains and improve an elongation rate, and it is an essential element for improving the rolling property of the electrical steel sheet that has strong brittleness and a bad rolling property.

However, when the carbon remains in the final product, it deteriorates the magnetic characteristic by precipitating the carbide formed by a magnetic aging effect in the product plate, so it may be controlled to be an appropriate content.

The content of C added into the slab is 0.02 to 0.08 wt %. When a small amount of C is contained in the slab within the range of the content of Si, the phase transformation between ferrite and austenite is not sufficiently generated to thus cause non-uniformity of the slab and hot rolling microstructure, which may resultantly damage the cold rolling property.

On the other hand, after performing an annealing heat treatment to a hot rolled sheet, generation places of a Goss nucleus may be increased by activating fixation of a potential and increasing a shear strain area during the cold rolling by the residual carbon existing in the steel sheet. Therefore, a Goss grain fraction of the primary recrystallization microstructure is increased, so it seems to be more profitable the more the content of C is, but when a very big amount of C is contained in the slab in the above-noted range of the content of Si, a sufficient decarburization result may not be obtained in the primary recrystallization annealing process, the secondary recrystallization texture is substantially damaged by the phase transformation phenomenon caused by this, and when the final product is applied to a power device, the magnetic characteristic may be deteriorated by the magnetic aging. In detail, the content of C in the slab may be 0.03 to 0.07 wt %.

As described, equal to or less than 0.005 wt % of C is included in the finally produced electrical steel sheet by the decarburization in the primary recrystallization annealing process in the process for manufacturing an electrical steel sheet. In detail, equal to or less than 0.003 wt % of C is included in the finally manufactured electrical steel sheet.

0.01 to 0.05 wt % of Sb

The antimony (Sb) is segregated to the grain boundary to suppress the growth of grains, and stabilizes the secondary recrystallization as effects. However, its melting point is low so diffusion to the surface is easy during the primary recrystallization annealing, so decarburization, formation of an oxidation layer, and a nitriding caused by a nitrification are hindered as effects. Therefore, when Sb is added for more than a predetermined level, decarburization is hindered and formation of the oxidation layer which is a basis of base coating is suppressed, so there is a limit of addition.

When the content of Sb is very much small, the grain growth suppressing effect may be scarce. On the other hand, when the content of Sb is very much big, the grain growth suppressing effect and the diffusion to the surface increase so a stable secondary recrystallization is not obtained and surface quality may be lowered.

In detail, 0.02 to 0.04 wt % of Sb may be included.

0.03 to 0.08 wt % of Sn

The tin (Sn) is a grain boundary segregating element, and it hinders movement of a grain boundary, so it is known as a grain growth inhibiting agent. The grain growth suppressing force for a fluent secondary recrystallization behavior is insufficient at the time of a secondary recrystallization annealing within a predetermined range of the content of Si, so the Sn for hindering the movement of the grain boundary by segregating to the grain boundary is needed.

When the content of Sn is very much small, the improved effect of the magnetic characteristic may be scarce. On the contrary, when the content of Sn is very much big, the grain growth suppressing force may be very strong and it may be difficult to obtain a stable secondary recrystallization when a temperature raising rate is adjusted or is not maintained for a predetermined time in the primary recrystallization annealing section.

In detail, 0.05 to 0.07 wt % of Sn may be included.

0.01 to 0.2 wt % of Cr

The chromium (Cr) may accelerate hard formation in the hot rolled sheet and the annealing plate to accelerate formation of the texture of {110}<001> in the cold rolling, and may reduce the time for maintaining austenite phase transformation by accelerating decarburization of C so as to prevent the phenomenon in which the texture is damaged during the primary recrystallization annealing process. During the primary recrystallization annealing process, the drawback that formation of an oxidation layer is hindered by Sn and Sb from among alloying elements used as a supplementary grain growth inhibiting agent may be solved by accelerating the formation of the oxidation layer on the surface, which is an effect.

When the content of Cr is very much small, the above-noted effect may not be manifest. When the content of Cr is very much big, the formation of an oxidation layer may be deteriorated, and decarburization and nitriding may be hindered during the primary recrystallization annealing process.

In detail, 0.02 to 0.1 wt % of Cr may be included.

0.0005 to 0.1 wt % of Co

The cobalt (Co) is an alloying element that is efficient in improving the magnetic flux density by increasing magnetization of iron and simultaneously reduces the core loss by increasing resistivity.

When the content of Co is very much small, it may be difficult to obtain the above-described effect appropriately.

When the content of Co is very much big, the phase transformation amount of austenite may increase to give a negative influence to a microstructure, a precipitate, and texture.

In detail, 0.01 to 0.05 wt % of Co may be included.

To be described, 0.0005 to 0.1 wt % of Co may be included in the slab, and 0.0003 to 0.097 wt % of Co may be included in the finally produced electrical steel sheet substrate. This is because some of Co is diffused to the metal oxide layer, and hence, the content thereof in the finally manufactured electrical steel sheet substrate may be less than Co in the slab. The Co may be diffused by equal to or less than 25%. In detail, 0.008 to 0.05 wt % of Co may be included in the finally produced electrical steel sheet substrate.

0.005 to 0.04 wt % of Al

The aluminum (Al) may function as a strong grain growth inhibiting agent when nitrogen ions introduced by ammonia gas in the annealing process after the cold rolling process in addition to an AlN finely precipitated at the time of a hot rolling and a hot rolled sheet annealing are combined with Al, Si, and Mn existing as a solid solution in the steel to generate a nitride in an (Al,Si,Mn) N and AlN form.

When Al is further included but a very much less amount thereof is included, a number and a volume of the formed nitride are very low, a sufficient effect as an inhibiting agent may not be expected. When the content of Al is very big, a coarsened nitride may be formed, and the grain growth suppressing force may be reduced.

In detail, when the Al is further included, 0.01 to 0.035 wt % of Al may be included 0.01 to 0.2 wt % of Mn The manganese (Mn) is an element of reducing the entire core loss by reducing an eddy current loss by increasing resistivity in a like way of Si. The manganese (Mn) is an important element of generating a Mn-based sulfide in reaction to S in a state of lull, and reacts to the nitrogen introduced by a nitrification together with Si to form a precipitate of (Al,Si,Mn) N and suppress growth of the primary recrystallized grains and thereby generate a secondary recrystallization. Therefore, Mn may be further included.

When a very small amount of Mn is included in the case of adding Mn, the number and the volume of forming the precipitates are low, so a sufficient effect as an inhibiting agent may not be expected. When the content of Mn is very big, a large amount of oxides of (Fe, Mn) and Mn in addition to $Fe_2SiO_4$ are formed on the surface of the steel sheet to hinder formation of a base coating produced during a high-temperature annealing process, so surface quality may be deteriorated. A phase transformation between ferrite and austenite is caused in the secondary recrystallization annealing process, so the texture may be substantially damaged and the magnetic characteristic may be substantially deteriorated. In detail, when Mn is further included, 0.05 to 0.15 wt % thereof may be included.

Equal to or Less than 0.01 wt % of N

The nitrogen (N) is an important element of forming AlN in reaction to Al, and when N is further included in the slab, the added content of N is equal to or less than 0.01 wt %. When a very large amount of N is added, a surface defect which is referred to as a blister caused by a diffusion of nitrogen is generated in a process after a hot rolling process, and a large amount of the nitride is formed in the slab state, so it may be difficult to perform a rolling, a subsequent process may become complicated, and the manufacturing cost may increase.

On the other hand, N that is additionally needed in formation of nitrides such as (Al,Si,Mn) N, AlN, or (Si,Mn) N is reinforced by performing a nitrification to the steel by use of nitrification gas in the annealing process after a cold rolling. Some of N is removed in the secondary recrystallization annealing process. Therefore, the content of N of the finally produced electrical steel sheet may be equal to or less than 0.01 wt %.

Equal to or Less than 0.01 wt % of S

When the content of sulfur(S) is very big, precipitates of MnS are formed in the slab to suppress the grain growth, and in the case of casting, it is segregated in a center of the slab, so it is difficult to control a microstructure in the subsequent process. Therefore, when MnS is not used as a grain growth inhibiting agent, S may not be added by the content that is inevitably input.

0.0005 to 0.045 wt % of P

The phosphorus (P) may perform an auxiliary function of segregating to the grain boundary to hinder the movement of the grain boundary, and simultaneously suppressing the grain growth, and in the viewpoint of the microstructure, it improves the texture of {110}<001>.

When the content of P is very much less in the case of further including P, the adding effect is slight, and when the content of P is very much big, brittleness may increase and the rolling property may be substantially deteriorated.

Regarding the description on the manufacturing method, the slab may be heated at equal to or less than 1250° C. According to this, precipitates of an Al-based nitride or a Mn-based sulfide may be incompletely dissolved or completely dissolved depending on a stoichiometric relationship between the dissolved Al and N, and M and S.

When heating of the slab is completed, a hot rolling is performed to manufacture a hot rolled sheet. A thickness of the hot rolled sheet may be 1.0 to 3.5 mm.

A hot rolled sheet annealing may then be performed. A soaking temperature in the hot rolled sheet annealing process may be 800 to 1300° C.

The hot rolled sheet is cold rolled to manufacture a cold-rolled sheet. The cold rolling including a cold rolling or an intermediate annealing performed once may be performed for at least twice. The thickness of the cold-rolled sheet may be 0.1 to 0.5 mm.

The cold-rolled sheet undergoes a primary recrystallization annealing. In the primary recrystallization annealing process, moisture in a wet atmosphere reacts to base iron and Si contained in the base iron to form an oxidation layer, and when the oxidation layer is excessively densely formed than needed, carbons in the base metal is not fluently decarburized to the outside, so the phase transformation between ferrite and austenite is maintained, and the Goss texture from among the primary recrystallization texture is damaged. Further, Co from among the alloying elements in the steel sheet is excessively diffused to the oxidation layer, and an appropriate amount of Co does not remain in the steel sheet. When there is no Co in the steel sheet, the effect of improving magnetism by an addition of Co may be insufficiently achieved.

When an oxidization ability of a heating zone and a soaking zone is properly controlled in the above-noted formation of an oxidation layer, damaging of the Goss texture may be minimized. Further, excessive diffusion of Co to the oxidation layer may be suppressed.

In detail, the primary recrystallization annealing process includes a first temperature rising stage, a second temperature rising stage, and a soaking stage, and the oxidization ability ($P_{H2O}/P_{H2}$) of the first temperature rising stage is 0.7 to 2.0, the oxidization ability of the second temperature rising stage is 0.05 to 0.6, and the oxidization ability of the soaking stage is 0.3 to 0.6.

The oxidization ability of the first temperature rising stage may be 0.7 to 2.0. When the oxidization ability of the first temperature rising stage is very much small, moisture used to a decarburization reaction may be insufficiently supplied, so the decarburization may be retarded and the Goss texture may be damaged. When the oxidization ability of the first temperature rising stage is very much big, the oxidation layer is densely formed on the surface of the base metal, the decarburization behavior is retarded, and the Goss texture is resultantly damaged. In detail, the oxidization ability of the first temperature rising stage may be 0.8 to 1.5.

The first temperature rising stage includes increasing the temperature of the cold-rolled sheet up to an ending temperature of 710 to 770° C. In detail, the ending temperature of the first temperature rising stage is 720 to 760° C. In detail, the ending temperature of the first temperature rising stage is 740° C.

The oxidization ability of the second temperature rising stage may be 0.05 to 0.6. When the oxidization ability of the second temperature rising stage is very much less, an oxygen supplying amount may be insufficient compared to a fast diffusion rate of oxygen by the moisture in the atmosphere gas, and the decarburization may be retarded. When the oxidization ability of the second temperature rising stage is very big, the oxidation layer on the surface may become excessively dense and the decarburization behavior may be delayed. In detail, the oxidization ability of the second temperature rising stage may be 0.1 to 0.3.

The second temperature rising stage represents increasing the temperature up to the ending temperature of 830 to 890° C. from the ending temperature of the first temperature rising stage. That is, the temperature rises to the ending temperature of 830 to 890° C. from a starting temperature of 710 to 770° C. In detail, the starting temperature of the second temperature rising stage is 720 to 760° C., and the ending temperature is 840 to 880° C. In detail, the starting temperature of the second temperature rising stage is 740° C., and the ending temperature is 860° C.

The oxidization ability of the first temperature rising stage and the oxidization ability of the second temperature rising stage may satisfy Equation 1.

$$0.3 \le [P1]-[P2] \le 1.6 \quad \text{[Equation 1]}$$

(In Equation 1, [P1] and [P2] respectively signify the oxidization ability of the first temperature rising stage and the oxidization ability of the second temperature rising stage.)

When Equation 1 is satisfied, the drawback in which the oxidation layer is excessively dense on the surface may be solved while the decarburization is smoothly performed. In detail, a bottom limit of Equation 1 may be 0.5 and a top limit may be 1.0.

The oxidization ability of the soaking stage may be 0.3 to 0.6. When the oxidization ability of the soaking stage is very small, the magnetic aging effect in which the oxygen supplying amount by the moisture in the atmosphere gas becomes insufficient, many residual carbons remain after the decarburization annealing, so bad influences are given to the final product may be generated. When the oxidization ability of the soaking stage is very big, an excessively dense external oxidation layer is formed to hinder additional decarburization, so the magnetic aging effect is increased in a like manner of the above-described effect, so a continuous deterioration of magnetism may be generated during the use of final products. In detail, the oxidization ability of the soaking stage may be 0.35 to 0.55.

The soaking stage is a stage for maintaining the temperature within the range of the ending temperature of the second temperature rising stage to 900° C. That is, the soaking stage maintains the temperature in the range of the starting temperature of 830 to 890° C. to the temperature of 900° C. In detail, the soaking stage maintains the temperature in the range of 840° C. to 900° C. In detail, the soaking stage in the temperature range of greater than 860° C. to 900° C.

The oxidization ability of the second temperature rising stage and the oxidization ability of the soaking stage may satisfy Equation 2.

$$-0.1 \le [P3]-[P2] \le 0.5 \quad \text{[Equation 2]}$$

(In Equation 2, [P2] and [P3] respectively signify the oxidization ability of the second temperature rising stage and the oxidization ability of the soaking stage.)

When Equation 2 is satisfied, the drawback in which the oxidation layer is excessively dense on the surface may be solved while the decarburization is smoothly performed. In detail, the bottom limit of Equation 2 may be 0.05 and the top limit may be 0.4.

The oxidization ability of the first temperature rising stage and the oxidization ability of the soaking stage may satisfy Equation 3.

$$0.3 \le [P1]-[P3] \le 1.5 \quad \text{[Equation 3]}$$

(In Equation 3, [P1] and [P3] respectively signify the oxidization ability of the first temperature rising stage and the oxidization ability of the soaking stage.)

When Equation 3 is satisfied, the drawback in which the oxidation layer is excessively dense on the surface may be solved while the decarburization is smoothly performed. In detail, the bottom limit of Equation 3 may be 0.5 and the top limit may be 1.0.

As described above, by precisely controlling the oxidization ability during the primary recrystallization annealing process, the Goss texture may be prevented from being damaged, and the excessive diffusion of Co to the oxidation layer may be suppressed. Further, integrity of the Goss texture of the finally produced grain-oriented electrical steel sheet is improved, and the size of the secondary recrystallized grains is coarsened, thereby preventing deterioration of the magnetic characteristic. In addition, a large amount of Co remains on the steel sheet substrate, and the amount of C diffusing to the metal oxide layer may be reduced. Also, by precisely controlling the oxidization ability during the primary recrystallization annealing process, an average of β of the secondary recrystallization may be controlled to be equal to or less than 3° after the secondary recrystallization annealing is performed. By this, an excellent magnetic characteristic may be obtained. The angle of β signifies an angle between a direction of [001] of texture and a rolling direction axis with respect to a vertical rolling side.

In at least one of the first temperature rising stage, the second temperature rising stage, and the soaking stage, the atmosphere gas may contain equal to or less than 50 wt % of nitrification gas. In detail, the nitrification gas may include ammonia. By including an appropriate amount of nitrification gas, nitrogen ions may be introduced to the steel sheet, and (Al, Si,Mn) N and AlN that are inhibiting agents may be precipitated and may then be used as inhibiting agents.

The first temperature rising stage, the second temperature rising stage, and the soaking stage may be distinguished by temperature sections, and the respective stages may be sequentially performed.

In a reducing atmosphere just before/after the primary recrystallization annealing heat treatment finishes, some or all the external oxidation layer formed on the surface of the steel sheet having undergone the primary recrystallization annealing may be reduced and removed.

The cold-rolled sheet having undergone the primary recrystallization annealing may undergo a secondary recrystallization annealing. An annealing separating agent may be applied to the steel sheet before the secondary recrystallization annealing is performed. The annealing separating agent is known to a person skilled in the art and it will not be described. For example, the annealing separating agent with MgO as a major component may be used.

Purposes of the secondary recrystallization annealing generally include: formation of texture of {110}<001> by the secondary recrystallization, assignment of insulation by forming a glassy film caused by a reaction of the oxidation layer formed at the time of a primary recrystallization annealing and MgO, and removal of impurities damaging the magnetic characteristic. Regarding the secondary recrystallization annealing method, a gas mixture of nitrogen and hydrogen is maintained to protect the nitride that is a particle growth inhibiting agent so that the secondary recrystallization may be well developed in the temperature rising section before the secondary recrystallization is generated, and the same is maintained for a long time at 100% of the hydrogen atmosphere to remove the impurities in the soaking stage after the secondary recrystallization is completed.

The secondary recrystallization annealing process may be performed at the soaking temperature of 900 to 1210° C.

The oxidation layer formed in the primary recrystallization annealing process and the annealing separating agent component react to each other to form a metal oxide layer in the secondary recrystallization annealing.

In this instance, the metal oxide layer includes 0.0005 to 0.25 wt % of Co. As described above, by precisely controlling the degree of oxidation in the primary recrystallization annealing, the diffusion of Co to the oxidation layer is suppressed, so the content of Co is contained in the metal oxide layer. When the metal oxide layer include a large amount of Co, a small amount of Co is contained in the steel sheet substrate, so it is difficult to obtain the magnetism improving effect caused by Co. In detail, the metal oxide layer may include 0.005 to 0.25 wt % of Co. In detail, the metal oxide layer may include 0.008 to 0.23 wt % of Co. An alloying component in the metal oxide layer may have a concentration gradient depending on the thickness, and in an embodiment of the present invention, the alloying component of the metal oxide layer signifies an average content in the metal oxide layer.

The metal oxide layer further includes, in addition to Co, 10 to 30 wt % of Si, 30 to 55 wt % of O, 25 to 50 wt % of Mg, a remainder of Fe, and inevitable impurities. Si and Fe may be derived from the steel sheet substrate. Mg may be derived from the annealing separating agent. O may be derived from the diffusion of oxygen in the atmosphere during the primary recrystallization annealing process.

The metal oxide layer may be 0.5 to 10 μm thick. In detail, it may be formed to be 0.5 to 5 μm thick. In detail, it may be formed to be 1 to 3 μm thick. In this instance, the thickness signifies an average thickness.

Figure 2:
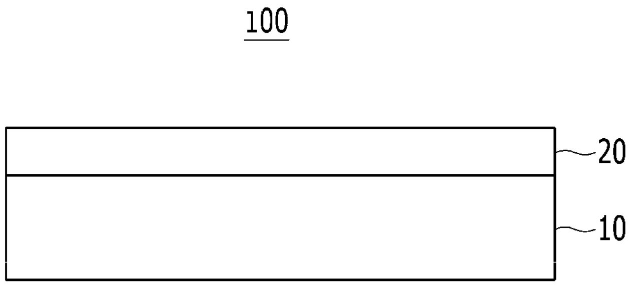
FIG. 2 shows a cross-sectional view of a grain-oriented electrical steel sheet according to an embodiment of the present invention.

FIG. 2 shows a cross-sectional view of a grain-oriented electrical steel sheet according to an embodiment of the present invention. As shown in FIG. 2, the grain-oriented electrical steel sheet according to an embodiment of the present invention includes an electrical steel sheet substrate 10 and a metal oxide layer 20 positioned on the surface of the electrical steel sheet substrate 10. FIG. 2 illustrates an example in which the metal oxide layer 20 is positioned on one side, and without being limited thereto, the metal oxide layer 20 may be positioned on one side or respective sides of the surface of the electrical steel sheet substrate 10.

The grain-oriented electrical steel sheet substrate 10 according to an embodiment of the present invention includes, by wt %, 2.0 to 6.0% of Si, equal to or less than 0.005% of C, 0.01 to 0.05% of Sb, 0.03 to 0.08% of Sn, 0.01 to 0.2% of Cr, 0.0003 to 0.9% of Co, a remainder of Fe, and inevitable impurities.

The grain-oriented electrical steel sheet substrate 10 may further include at least one of 0.005 to 0.04 wt % of Al, 0.01 to 0.2 wt % of Mn, equal to or less than 0.01 wt % of N, equal to or less than 0.01 wt % of S, and 0.0005 to 0.045 wt % of P.

The alloying component and the microstructure of the grain-oriented electrical steel sheet correspond to the above-provided description, so no repeated descriptions will be provided.

The metal oxide layer 20 may include 0.0005 to 0.5 wt % of Co.

The metal oxide layer 20 may further include 10 to 30 wt % of Si, 30 to 55 wt % of O, 25 to 50 wt % of Mg, a remainder of Fe, and inevitable impurities. The metal oxide layer 20 may further include Mn and Al.

The grain-oriented electrical steel sheet substrate includes a secondary recrystallization, and an average angle of β of the secondary recrystallization is equal to or less than 3°.

In particular, the grain-oriented electrical steel sheet has excellent core loss and magnetic flux density characteristics. Regarding the grain-oriented electrical steel sheet, the magnetic flux density ($B_8$) may be equal to or greater than 1.9 T, and the core loss ($W_{17/50}$) may be equal to or less than 0.85 W/kg. In this instance, the magnetic flux density ($B_8$) represents a magnitude (Tesla) of the magnetic flux density induced in a magnetic field of 800 A/m, and the core loss ($W_{17/50}$) indicates a magnitude (W/kg) of the core loss induced in the condition of 1.7 Tesla and 50 Hz. In detail, the grain-oriented electrical steel sheet may have the magnetic flux density ($B_8$) that is equal to or greater than 1.91 T and the core loss ($W_{17/50}$) that is equal to or less than 0.83 W/kg.

A detailed embodiment of the present invention will now be described. However, the embodiment to be described below is a detailed example of the present invention, and the present invention is not limited thereto.

Embodiment

A steel material including, by wt %, 3.4% of Si, 0.06% of C, 0.005% of S, 0.005% of N, 0.029% of Al, 0.027% of Sb, 0.065% of Sn, 0.030% of P, 0.04% of Cr, and 0.032% of Co, a remainder of Fe, and inevitable impurities is vacuum melted to make an ingot, heat is applied thereto at the temperature of 1150° C., and it is hot rolled with the thickness of 2.3 mm. The hot rolled sheet is heated at the temperature of 1085° C., it is maintained at 920° C. for 160 seconds, and it is quenched in water. The hot rolled sheet annealing sheet is pickled, it is then rolled once with the thickness of 0.23 mm, the atmospheres of the first temperature rising stage, the second temperature rising stage, and the soaking stage are controlled according to oxidization abilities expressed in Table 1, the ammonia mixed gas atmosphere is maintained, and a decarburization and a nitrification are performed so that the content of carbon may be equal to or less than 30 ppm, and the content of nitrogen may be 170 ppm. The first temperature rising stage is performed on average at the room temperature to 740° C. The second temperature rising stage is performed at greater than 740° C. to 860° C. The soaking stage is maintained at the temperature range of 860° C. to 900° C.

It is found that the metal oxide layer with the average thickness of about 2.8 μm is formed on respective surfaces of the electrical steel sheet. Regarding the content of Co in the metal oxide layer, the content of Co in the steel sheet substrate is measured, the content of Co in the steel sheet substrate is excluded from the content of Co (0.032 wt %) of the slab, and the total amount of Co diffused to the metal oxide layer is expressed in Table 2. The content of Co in the metal oxide layer is found by converting the diffused content of Co to the average thickness of the metal oxide layer.

The metal oxide layer includes about 21 wt % of Si, about 32 wt % of O, and about 45 wt % of Mg in addition to Co, and the remainder was Fe and inevitable impurities.

MgO which is an annealing separating agent is applied on the steel sheet to perform a secondary recrystallization annealing, and the secondary recrystallization annealing is performed at the mixture atmosphere of 25 volume % of nitrogen and 75 volume % of hydrogen up to 1200° C., and it is maintained for more than 10 hours at the atmosphere of 100 volume % of hydrogen after reaching 1200° C., and is then cooled. Measured values of the magnetic characteristics and the angles of β for the respective conditions are given in Table 1. The magnetic flux density ($B_8$, 800 A/m) and the core loss ($W_{17/50}$) of the steel sheet after the secondary recrystallization annealing is performed are measured by use of a single sheet measuring method and are then summarized as in Table 2.

TABLE 1

| Oxidization abilities for respective temperature zones | | | | | | |
|---|---|---|---|---|---|---|
| First temperature rising stage | Second temperature rising stage | Soaking stage | Equation 1 | Equation 2 | Equation 3 | Division |
| 0.46 | 0.044 | 0.18 | 0.416 | 0.136 | 0.28 | Comparative material 1 |
| 0.39 | 0.012 | 0.53 | 0.378 | 0.518 | −0.14 | Comparative material 2 |
| 0.4 | 0.036 | 0.87 | 0.364 | 0.834 | −0.47 | Comparative material 3 |
| 0.33 | 0.07 | 0.22 | 0.26 | 0.15 | 0.11 | Comparative material 4 |
| 0.14 | 0.426 | 0.54 | −0.286 | 0.114 | −0.4 | Comparative material 5 |
| 0.36 | 0.329 | 0.96 | 0.031 | 0.631 | −0.6 | Comparative material 6 |
| 0.38 | 0.95 | 0.23 | −0.57 | −0.72 | 0.15 | Comparative material 7 |
| 0.59 | 0.8 | 0.49 | −0.21 | −0.31 | 0.1 | Comparative material 8 |
| 0.18 | 0.62 | 0.85 | −0.44 | 0.23 | −0.67 | Comparative material 9 |

TABLE 1-continued

| Oxidization abilities for respective temperature zones | | | | | | |
|---|---|---|---|---|---|---|
| First temperature rising stage | Second temperature rising stage | Soaking stage | Equation 1 | Equation 2 | Equation 3 | Division |
| 1.18 | 0.027 | 0.16 | 1.153 | 0.133 | 1.02 | Comparative material 10 |
| 1.84 | 0.015 | 0.56 | 1.825 | 0.545 | 1.28 | Comparative material 11 |
| 1.02 | 0.027 | 0.71 | 0.993 | 0.683 | 0.31 | Comparative material 12 |
| 1.44 | 0.1 | 0.11 | 1.34 | 0.01 | 1.33 | Comparative material 13 |
| 1.83 | 0.388 | 0.47 | 1.442 | 0.082 | 1.36 | Invention material 1 |
| 0.95 | 0.256 | 0.51 | 0.694 | 0.254 | 0.44 | Invention material 2 |
| 0.79 | 0.398 | 0.47 | 0.392 | 0.072 | 0.32 | Invention material 3 |
| 1.53 | 0.234 | 0.58 | 1.296 | 0.346 | 0.95 | Invention material 4 |
| 0.71 | 0.423 | 0.33 | 0.287 | −0.093 | 0.38 | Invention material 5 |
| 1.51 | 0.59 | 0.55 | 0.92 | −0.04 | 0.96 | Invention material 6 |
| 1.71 | 0.406 | 0.46 | 1.304 | 0.054 | 1.25 | Invention material 7 |
| 1.02 | 0.136 | 0.33 | 0.884 | 0.194 | 0.69 | Invention material 8 |
| 1.69 | 0.116 | 0.46 | 1.574 | 0.344 | 1.23 | Invention material 9 |
| 0.76 | 0.159 | 0.39 | 0.601 | 0.231 | 0.37 | Invention material 10 |
| 0.97 | 0.266 | 0.51 | 0.704 | 0.244 | 0.46 | Invention material 11 |
| 1.2 | 0.24 | 0.46 | 0.96 | 0.22 | 0.74 | Invention material 12 |
| 0.84 | 0.067 | 0.51 | 0.773 | 0.443 | 0.33 | Invention material 13 |
| 1.76 | 0.371 | 0.47 | 1.389 | 0.099 | 1.29 | Invention material 14 |
| 1.27 | 0.26 | 0.74 | 1.01 | 0.48 | 0.53 | Comparative material 14 |
| 1.01 | 0.79 | 0.15 | 0.22 | −0.64 | 0.86 | Comparative material 15 |
| 1.88 | 0.81 | 0.38 | 1.07 | −0.43 | 1.5 | Comparative material 16 |
| 0.96 | 0.85 | 0.85 | 0.11 | 0 | 0.11 | Comparative material 17 |
| 2.48 | 0.015 | 0.13 | 2.465 | 0.115 | 2.35 | Comparative material 18 |
| 3.4 | 0.031 | 0.48 | 3.369 | 0.449 | 2.92 | Comparative material 19 |

TABLE 1-continued

| Oxidization abilities for respective temperature zones | | | | | | |
|---|---|---|---|---|---|---|
| First temperature rising stage | Second temperature rising stage | Soaking stage | Equation 1 | Equation 2 | Equation 3 | Division |
| 2.43 | 0.019 | 0.92 | 2.411 | 0.901 | 1.51 | Comparative material 20 |
| 3.45 | 0.056 | 0.12 | 3.394 | 0.064 | 3.33 | Comparative material 21 |
| 3 | 0.381 | 0.43 | 2.619 | 0.049 | 2.57 | Comparative material 22 |
| 3.13 | 0.202 | 0.71 | 2.928 | 0.508 | 2.42 | Comparative material 23 |
| 3.26 | 0.72 | 0.21 | 2.54 | −0.51 | 3.05 | Comparative material 24 |
| 2.44 | 0.71 | 0.52 | 1.73 | −0.19 | 1.92 | Comparative material 25 |
| 2.94 | 0.69 | 0.63 | 2.25 | −0.06 | 2.31 | Comparative material 26 |

TABLE 2

| Core loss ($W_{17/50}$) | Magnetic flux density ($B_8$) | Content of Co in electrical steel sheet substrate (wt %) | Diffused amount Co to of metal oxide layer (wt %) | Content of Co in metal oxide layer (wt %) | Average angle of β (°) | Divisions |
|---|---|---|---|---|---|---|
| 0.88 | 1.86 | 0.0204 | 0.0116 | 0.476 | 6 | Comparative material 1 |
| 0.85 | 1.88 | 0.0196 | 0.0124 | 0.509 | 5.4 | Comparative material 2 |
| 0.91 | 1.86 | 0.0232 | 0.0088 | 0.361 | 5.8 | Comparative material 3 |
| 0.88 | 1.89 | 0.021 | 0.011 | 0.452 | 4.6 | Comparative material 4 |
| 0.84 | 1.9 | 0.0208 | 0.0112 | 0.46 | 3.7 | Comparative material 5 |
| 0.87 | 1.88 | 0.0239 | 0.0081 | 0.333 | 5.8 | Comparative material 6 |
| 0.88 | 1.86 | 0.0236 | 0.0084 | 0.345 | 5.5 | Comparative material 7 |
| 0.88 | 1.89 | 0.0205 | 0.0115 | 0.472 | 5.1 | Comparative material 8 |
| 0.9 | 1.86 | 0.0244 | 0.0076 | 0.312 | 5.4 | Comparative material 9 |
| 0.88 | 1.89 | 0.0234 | 0.0086 | 0.353 | 5.1 | Comparative material 10 |
| 0.84 | 1.9 | 0.0214 | 0.0106 | 0.435 | 4.4 | Comparative material 11 |
| 0.88 | 1.89 | 0.0203 | 0.0117 | 0.481 | 5.4 | Comparative material 12 |
| 0.86 | 1.89 | 0.0201 | 0.0119 | 0.489 | 4.5 | Comparative material 13 |
| 0.8 | 1.92 | 0.0287 | 0.0033 | 0.136 | 2.6 | Invention material1 |
| 0.8 | 1.92 | 0.0317 | 0.0003 | 0.012 | 2.9 | Invention material2 |
| 0.81 | 1.92 | 0.0272 | 0.0048 | 0.197 | 1.8 | Invention material3 |
| 0.8 | 1.92 | 0.0269 | 0.0051 | 0.209 | 1.9 | Invention material4 |
| 0.81 | 1.94 | 0.0283 | 0.0037 | 0.152 | 2.7 | Invention material5 |

TABLE 2-continued

| Core loss ($W_{17/50}$) | Magnetic flux density ($B_8$) | Content of Co in electrical steel sheet substrate (wt %) | Diffused amount Co to of metal oxide layer (wt %) | Content of Co in metal oxide layer (wt %) | Average angle of β (°) | Divisions |
|---|---|---|---|---|---|---|
| 0.79 | 1.93 | 0.0265 | 0.0055 | 0.226 | 2.6 | Invention material6 |
| 0.79 | 1.94 | 0.0273 | 0.0047 | 0.193 | 1.9 | Invention material7 |
| 0.8 | 1.92 | 0.0301 | 0.0019 | 0.078 | 2.9 | Invention material8 |
| 0.81 | 1.92 | 0.0271 | 0.0049 | 0.201 | 2.9 | Invention material9 |
| 0.79 | 1.94 | 0.031 | 0.001 | 0.041 | 2.1 | Invention material10 |
| 0.81 | 1.93 | 0.0318 | 0.0002 | 0.008 | 2.6 | Invention material11 |
| 0.8 | 1.91 | 0.0271 | 0.0049 | 0.201 | 2.6 | Invention material12 |
| 0.81 | 1.94 | 0.0264 | 0.0056 | 0.23 | 2.1 | Invention material13 |
| 0.81 | 1.93 | 0.0276 | 0.0044 | 0.181 | 2.6 | Invention material14 |
| 0.84 | 1.89 | 0.0234 | 0.0086 | 0.353 | 3.8 | Comparative material14 |
| 0.85 | 1.89 | 0.0198 | 0.0122 | 0.501 | 5.1 | Comparative material15 |
| 0.86 | 1.9 | 0.0197 | 0.0123 | 0.505 | 3.5 | Comparative material16 |
| 0.85 | 1.88 | 0.0209 | 0.0111 | 0.456 | 5.1 | Comparative material17 |
| 0.95 | 1.86 | 0.0195 | 0.0125 | 0.513 | 5.9 | Comparative material18 |
| 0.85 | 1.88 | 0.0217 | 0.0103 | 0.423 | 5.2 | Comparative material19 |
| 0.93 | 1.85 | 0.0253 | 0.0067 | 0.275 | 5.1 | Comparative material20 |
| 0.86 | 1.88 | 0.019 | 0.013 | 0.534 | 5 | Comparative material21 |
| 0.84 | 1.9 | 0.0239 | 0.0081 | 0.333 | 3.7 | Comparative material22 |
| 0.85 | 1.89 | 0.021 | 0.011 | 0.452 | 5.1 | Comparative material23 |
| 0.95 | 1.87 | 0.0252 | 0.0068 | 0.279 | 5.3 | Comparative material24 |
| 0.88 | 1.88 | 0.0252 | 0.0068 | 0.279 | 5.2 | Comparative material25 |
| 0.89 | 1.85 | 0.0251 | 0.0069 | 0.283 | 5.2 | Comparative material26 |

As expressed in Table 1 and Table 2, it is found from the invention material having appropriately controlled the oxidization abilities of the first temperature rising stage, the second temperature rising stage, and the soaking stage that the diffusion of Co to the metal oxide layer is suppressed, the average angle of β of the secondary recrystallization is small, and the magnetic characteristic is excellent ultimately when compared to the comparative material.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the embodiments described above are only examples and should not be construed as being limitative in any respects.

The invention claimed is:

1. A grain-oriented electrical steel sheet comprising:

an electrical steel sheet substrate including, by wt %, 2.0 to 6.0% of Si, equal to or less than 0.005% of C (excluding 0%), 0.01 to 0.05% of Sb, 0.03 to 0.08% of Sn, 0.01 to 0.2% of Cr, and 0.0003 to 0.097% of Co, and including a remainder of Fe and inevitable impurities; and a metal oxide layer disposed on a surface of the electrical steel sheet substrate, wherein the metal oxide layer includes 0.0005 to 0.25 wt % of Co, 10 to 30 wt % of Si, 30 to 55 wt % of 0, 25 to 50 wt % of Mg, a remainder of Fe and inevitable impurities.

2. The grain-oriented electrical steel sheet of claim 1, wherein the electrical steel sheet substrate further includes at least one of 0.005 to 0.04 wt % of Al, 0.01 to 0.2 wt % of Mn, equal to or less than 0.01 wt % of N, equal to or less than 0.01 wt % of S, and 0.0005 to 0.045 wt % of P.

3. The grain-oriented electrical steel sheet of claim 1, wherein a thickness of the metal oxide layer is 0.5 to 10 μm.

4. The grain-oriented electrical steel sheet of claim 1, wherein the electrical steel sheet substrate includes grains, and an average angle of β of the grains is equal to or less than 3°, here the angle of β signifies an angle between a direction [001] of texture and a rolling direction axis with respect to a vertical rolling plane.

* * * * *